United States Patent [19]

Warner, Jr.

[11] Patent Number: 5,081,957

[45] Date of Patent: Jan. 21, 1992

[54] DELIVERING DEVICE AND AFFILIATED RECEIVING BOWL FOR FEEDING AND WATERING PETS

[76] Inventor: Louis E. Warner, Jr., 4908 Pennington La., Blue Springs, Mo. 64015

[21] Appl. No.: 678,020

[22] Filed: Apr. 1, 1991

[51] Int. Cl.$^5$ .............................. A01K 7/00; A01K 5/01
[52] U.S. Cl. .......................................... 119/61; 119/72
[58] Field of Search ................ 119/72, 72.5, 51.01, 119/51.5, 61

[56] References Cited

U.S. PATENT DOCUMENTS

| | | | |
|---|---|---|---|
| 198,744 | 7/1878 | Johnson | 119/77 |
| 315,251 | 11/1885 | Cook | 119/77 |
| 395,490 | 10/1889 | French | 119/51.5 |
| 823,697 | 1/1906 | Richardson | 119/77 |
| 848,492 | 6/1906 | Rees | 119/51.5 |
| 905,278 | 7/1908 | Benefiel | 119/51.5 |
| 1,063,661 | 6/1913 | Critz | 119/61 |
| 1,113,887 | 9/1912 | Dragen et al. | 119/52 |
| 1,136,510 | 10/1915 | Crum | 119/77 |
| 1,482,466 | 4/1922 | Glasser | 119/77 |
| 1,522,084 | 1/1925 | Swearingen | 119/72 |
| 3,152,576 | 4/1963 | Faurot | 119/72 |
| 4,128,080 | 12/1978 | Haney | 119/61 |
| 4,192,256 | 8/1978 | Clugston | 119/51.5 |
| 4,976,223 | 12/1990 | Pierce | 119/61 |

Primary Examiner—John G. Weiss

[57] ABSTRACT

A delivering device used in conjunction with an affiliated receiving bowl to feed and water pets while in an upright, standing or sitting position. The delivering device consisting of an elongated open funnel at one end and a hook at the opposite end. The hook end of the delivering device permits the device to be positioned accurately over the receiving bowl which has an integral centered eye. The hook and eye arrangement permits the receiving bowl to be positioned for liquid filling while on the floor or lifted from the floor for solid filling and then returned to the floor.

1 Claim, 2 Drawing Sheets

DELIVERING DEVICE AND AFFILIATED RECEIVING BOWL FOR FEEDING AND WATERING PETS

BACKGROUND OF THE INVENTION

1. Field of the Invention

This invention relates to the feeding and watering of pets and, more particularly to the delivering device and affiliated receiving bowl required in order to feed and water pets from an upright, standing, or sitting position.

Older people and handicapped people have two major traits in common, intensified love for their pets and restricted physical movement in bending over to place food and water in the desired receptacle which is normally located on the floor. Many injuries have been caused, some of them fatal, when older or handicapped caregivers of pets have lost their balance and fallen while attempting to bend over to feed and water pets.

2. Description of the Prior Art

Heretofore the feeding and watering of pets by the physically limited caregivers who try to feed and water pets from an upright, standing, or sitting position resulted in danger of falling to the caregiver and inexact final positioning of the food and water. This inexact positioning of the food and water outside the desired receptacle resulted in waste, unsanitary and physically unsafe conditions for the caregiver and pet.

It is, therefore, the primary purpose of this invention to provide caregivers of pets who must feed and water their pets from an upright, standing, or sitting position a delivering device and an associated receiving bowl that will alleviate the necessity of bending over to feed and water pets.

Another purpose of this invention is to provide a delivering device and a receiving bowl that will minimize physical danger to caregivers of pets who would be in danger of falling if they bend over to feed and water pets.

Another purpose of this invention is to minimize physically unsafe conditions for caregiver and pet by providing a delivering device and a receiving bowl so that food and water may be delivered accurately to the desired receptacle.

Another purpose of this invention is to minimize unsanitary conditions by providing a delivering device and receiving bowl so that food and water may be delivered accurately to the desired receptacle.

Another purpose of this invention is to minimize waste by providing a delivering device and a receiving bowl so that food and water may be delivered accurately to the desired receptacle.

Still another purpose of this invention is to provide a delivering device and a receiving bowl so constructed that minimum storage space will be required.

A number of feeding and/or watering devices have been proposed in the past for livestock and pets. In general however these units have not addressed the needs of the physically limited caretaker. Patents illustrating these prior units include: U.S. Pat. Nos. 455,756, 712,243, 823,697, 1,063,661, 1,482,466, 1,522,084, 3,152,576, 4,128,080, 4,192,256, 4,976,223, 364,557 848,492, 905,278, and 1,113,887.

SUMMARY OF THE INVENTION

The problems outlined above are in large measure solved by the delivering device and receiving bowl in accordance with the present invention. That is to say the device and bowl, hereof are of lightweight durable material and are specially designed to minimize the possibility of food and water being delivered outside the desired receptacle. The hose is of flexible or semi-flexible material so that when not in use the hose may be u-turned and the hook placed over the lip of the funnel. This flexibility would minimize storage space.

The delivering device in accordance with the present invention broadly includes a funnel, a hose, and a hook; the receiving bowl will have a centered eye.

In particularly preferred form the delivering device funnel is to have the hose molded to and therefore permanently attached. Additionally, the hose is to have a hook molded to and therefore permanently attached. The bowl and eye are of unitary construction. The delivering device and receiving bowl are cooperatively designed so that the hook of the delivering device will engage the eye located in the center of the bowl. When the hook and eye are so engaged the bowl is positioned beneath the hose and when a liquid such as milk or water is poured into the funnel there will be traverse of the liquid between the funnel to the bowl via the hose. The bowl may be positioned on the floor in this manner for liquid filling or with the hook engaged in the eye the bowl may be lifted, placed at a convenient level, filled with solid food and then lowered to the floor. The caregiver may remain upright, standing, or seated and accurately deposit liquids or solids in the desired receptacle.

DESCRIPTION OF THE PREFERRED EMBODIMENT

Figure 1:
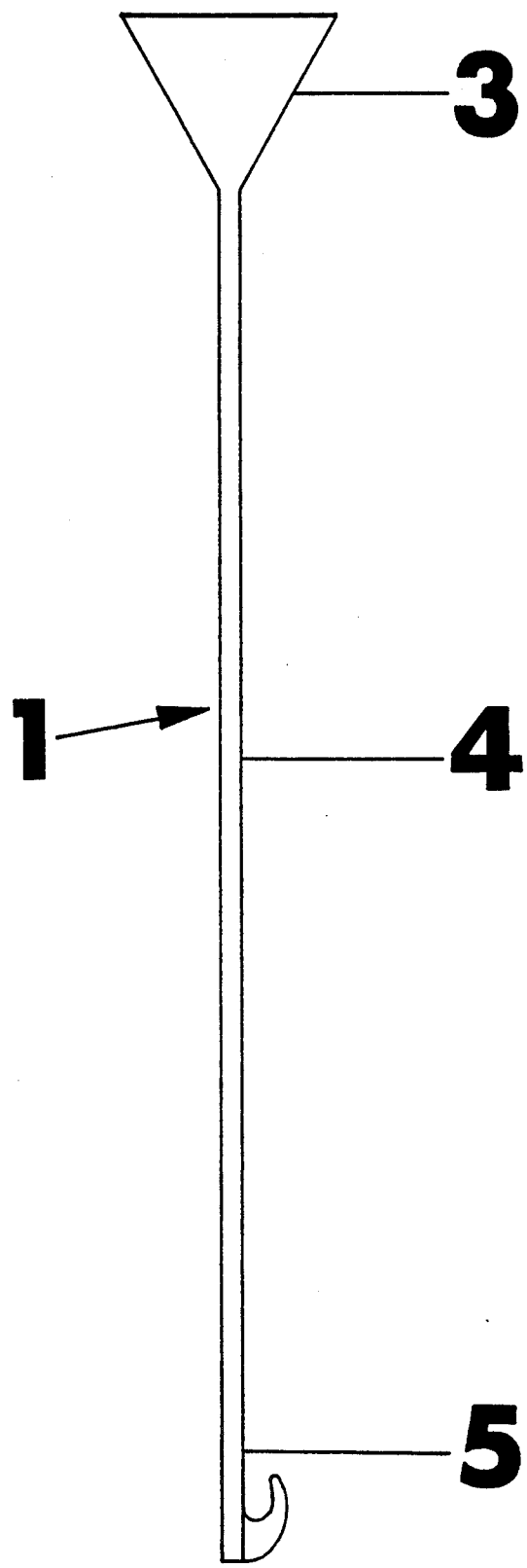
FIG. 1 is a perspective view of the delivering device in accordance with the present invention.
Figure 2:
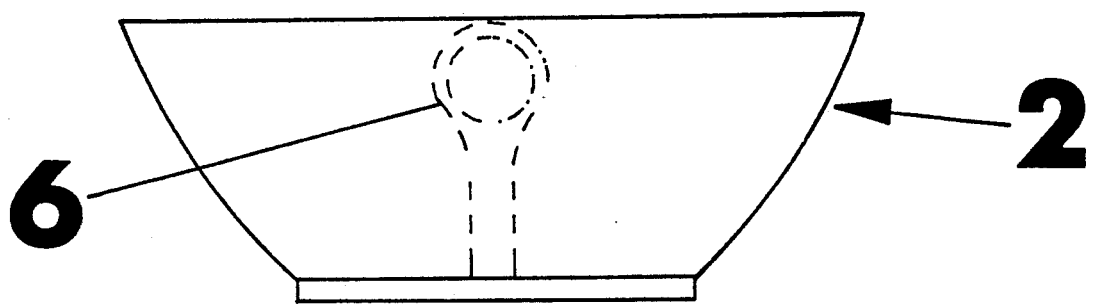
FIG. 2 is a perspective view of the affiliated receiving bowl and illustrates the internal construction of the bowl with centered eye.

Referring now to the drawing, a delivering device 1 and receiving bowl 2 used in conjunction with each other to feed and water pets while in an upright, standing, or sitting position broadly includes a funnel 3, with a hose 4, attached to the base of the funnel 3, to convey liquids to the bowl 2.

The hook 5 shall be permanently mounted near the open end of the hose 4 and shall be cooperatively designed with the eye 6 of the bowl 2 so when the hook 5 is engaged in the eye 6 a liquid may be accurately delivered to the bowl 2 or the bowl 2 may be lifted from the floor, placed at a convenient level, filled, and then returned to the floor.

In more detail the device 1 and bowl 2 are of lightweight material. The funnel 3 has the shape of a hollow cone that serves as a constricted channel and central organization which will catch and direct a downward flow of liquid into the attached hose 4, a hollow elongated cylindrical body that will convey the liquid into the bowl 2.

In use the receiving bowl 2 is properly positioned beneath the delivering device 1 when the hook 5 is engaged in the eye 6. At this time the bowl 2 is then positioned for liquid filling via the hose 4 or the bowl may be lifted via the delivering device 1, placed at a convenient level, filled with solid food and then lowered to the floor again with the delivering device 1. The combined length of the funnel 3 and the hose 4 shall be such that the person performing the feeding and watering activity may remain upright, standing, or sitting and accurately deliver food or water to the desired receptacle.

While only a single embodiment of the invention is disclosed herein for purposes of illustration it is to be understood that various changes and modifications may be made in this without departing from the spirit of the invention or the scope of the appended claim.

Having thus described the invention what is claimed as new and desired to be secured by Letters Patent is:

I claim:

1. A system for feeding and watering animals comprising a delivering device structure in combination with an animal feed bowl, said delivering device structure having an open-top funnel with a hose attached to the bottom opening of the funnel to allow for filling of the bowl in standing or sitting position, said hose having a bent hook located on the end of the hose, opposite the end attached to the funnel, said bowl having an upstanding eye formed in the center of the bowl to allow for the hook to engage and lift or lower the bowl for easy feeding in a standing or sitting position.

* * * * *